No. 686,217. Patented Nov. 5, 1901.
E. W. FAIRBANKS.
DIVIDED AXLE CAR TRUCK.
(Application filed Jan. 15, 1901.)
(No Model.)
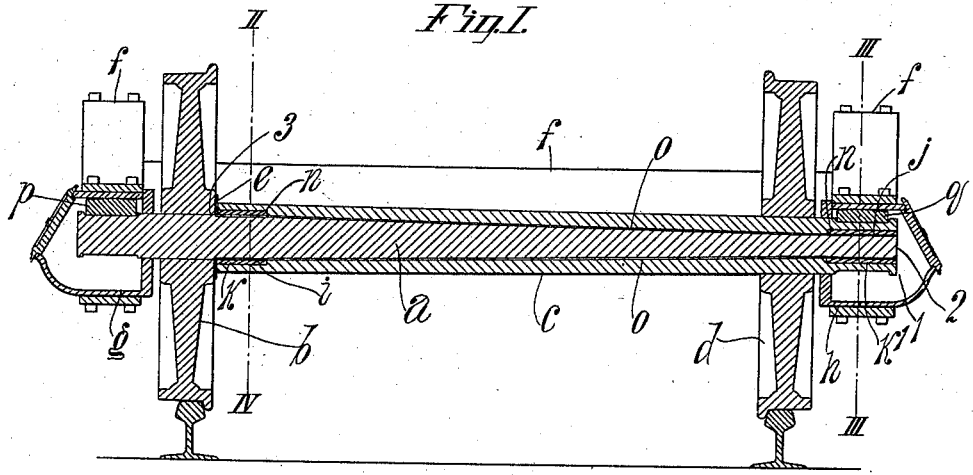
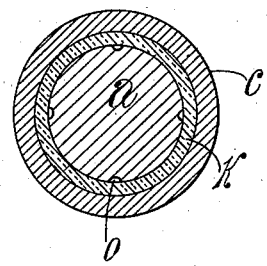 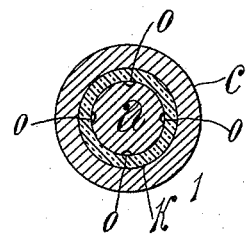 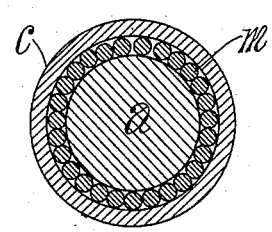
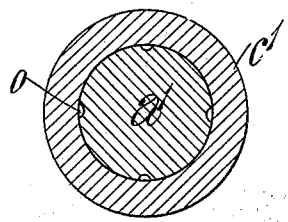
Witnesses
Inventor
Ephraim W. Fairbanks
by Townsend Bros.
his Atty.
THE NORRIS PETERS CO., PHOTO-LITHO., WASHINGTON, D. C.

UNITED STATES PATENT OFFICE.

EPHRAIM W. FAIRBANKS, OF LOS ANGELES, CALIFORNIA.

DIVIDED-AXLE CAR-TRUCK.

SPECIFICATION forming part of Letters Patent No. 686,217, dated November 5, 1901.

Application filed January 15, 1901. Serial No. 43,411. (No model.)

*To all whom it may concern:*

Be it known that I, EPHRAIM W. FAIRBANKS, a citizen of the United States, residing at Los Angeles, in the county of Los Angeles and State of California, have invented new and useful Improvements in Divided-Axle Car-Trucks, of which the following is a specification.

An object of this invention is to provide a practical car-truck having a divided axle which is superior to those formerly known in regard to cheapness, ease of assembling, strength, simplicity, and efficiency.

A further object is to provide for the efficient oiling of the bearings of the divided axle.

This truck is of that class in which provision is made to allow independent rotation of the wheels thereon to avoid friction in going around curves.

I purpose to make a divided car-axle which will be as substantial and strong as a solid car-axle and which will be freely lubricated by the oil from the oil-boxes of the truck.

The invention is involved in various constructions, and I do not limit my axle to one form of construction nor to any particular size or proportions. These may all be varied at the pleasure and within the judgment of the constructor without departing from my invention.

My invention comprises the combination, with the truck-beams, oil-boxes, and wheels, of an outer tubular axle member fixed to one of the wheels and projecting outward into one of the oil-boxes and inward toward the other wheel and an inner axle member fixed to the other wheel and projecting outward therefrom into the other oil-box on one side and extending on the other side of the wheel into the tubular outer member and turning inside the same, means being provided for oiling the bearings between said outer and inner members by oil from the oil-box of the tubular member. The wheel which is fixed on the inner axle member is arranged to receive the thrust of the outer axle member either directly or through an interposed antifriction-washer.

In the accompanying drawings I have shown the construction, form, and proportions which I deem preferable for the axle. Conventional truck-beams and oil-boxes are shown.

Figure I is a sectional elevation of a car-truck embodying my invention and showing a divided axle furnished with brass bushings at its internal bearings. Fig. II is a cross-section of said axle on line II IV, Fig. I. Fig. III is a cross-section of said axle on line III III, Fig. I. Fig. IV is a section of a modified form of axle on line indicated by line II IV, Fig. I, showing rollers substituted for the bushing, which is shown in Figs. I and II. Fig. V is a cross-section showing the divided axle in its simplest form without bushings or roller-bearings.

My newly-invented divided car-axle comprises an inner axle member $a$, which is preferably equal in length to the full length of the car-axle; a wheel $b$, shrunk or otherwise fixed on said inner axle member; an outer tubular axle member $c$, which is preferably flush at its outer end 1 with the outer end 2 of the member $a$; a wheel $d$, shrunk or otherwise fixed on the outer tubular axle member $c$, which member $c$ extends inward substantially to the hub of the wheel $b$, being there preferably supplemented by a hardened-steel washer $e$, which is a virtual extension of the tubular member $c$, designed to take the end pressure, if any, of the tubular member toward the wheel $b$ and to prevent wear.

$f$ indicates the beams of the truck, which are carried by the boxes $g$ $h$, which rest on the axle. The truck beams and boxes are arranged in the ordinary way to hold the outer and inner members of the axle in true position relative to each other.

The inner member $a$ of the axle is of less cross-section at its outer end 2 than at the point 3 inside the wheel $b$, which is fixed to it, and it preferably tapers between the larger diameter and the smaller diameter, and the bore of the tubular member preferably tapers correspondingly. The outer and inner members, however, are furnished with cylindrical portions at $i$ $j$ inside the ends of the tubular member to form bearings of considerable length between the two members at those points, so that the outer and inner members will be held rigidly relative to each other, even though such members are slid upon each other considerably from true position. Preferably some antifriction device will be employed at the cylindrical bearings $i\,j$. In Figs. I, II, and III, I have shown brass bushings $k\,k'$ for this purpose. In Fig. IV rollers $m$ are shown instead of the brass bushings.

$n$ indicates tubular gains or recesses at the ends of the tubular member $c$ to chamber the bushings or rollers, as the case may be.

$o$ indicates oil-channels in the inner member $a$ and the bushing $k'$ to admit oil from the oil-box $h$ to the bearing $i$.

In the form shown in Fig. V the outer member $c'$ is made to bear directly on the inner member $a'$ at the bearings without the interposition of any bushings or rollers. The outer end of the inner axle member $a$ projects from its wheel $b$ to support the box $g$ in the ordinary way. The outer end of the outer tubular axle member $c$ projects outside its wheel $d$ to support the box $h$, and the inner member $a$ preferably extends to the outer end of member $c$, as shown in Fig. I.

$p\,q$ indicate the brasses of the oil-boxes $g$ $h$ of the inner member $a$ and the outer member $c$, respectively. The inner member $a$ turns in the outer member $c$, and the hollow outer end of the outer tubular member $c$ and the oil ducts or channels $o$ constitute means provided for oiling the bearings between said outer and inner members by oil from the oil-box $h$ of the tubular outer member $c$.

What I claim, and desire to secure by Letters Patent of the United States, is—

1. The combination with the truck-beams, oil-boxes, and wheels, of an outer tubular axle member fixed to one of the wheels and projecting outward into one of the oil-boxes, and inwardly toward the other wheel; an inner axle member fixed to the other wheel and projecting outward therefrom into the other oil-box, on one side, and extending into the tubular outer member and turning inside the same, means being provided for oiling the bearings between said outer and inner members by oil from the oil-box of the tubular member.

2. The axle set forth comprising an outer tubular axle member having its bore enlarged at the ends to form outwardly-opening internal annular gains; a wheel fixed on the outer axle member; an inner axle member turning in the outer axle member; a wheel fixed to the inner axle member to receive the thrust of the outer axle member; and antifriction devices in the gains of the outer axle member to form bearings for the inner axle member.

3. The combination of a wheel; an inner axle member fixed to the wheel and formed with a cylindrical portion near the inside face of the wheel and with a cylindrical portion at the farther end of the member; another wheel; a tubular outer axle member fixed to said other wheel and furnished at its ends and on opposite sides of said wheel with bearings for the cylindrical portions of the inner axle member, the cylindrical portion of the inner axle member which is nearest the wheel of such member being of greater diameter than the cylindrical portion at the other end of said inner member, and which is outside the other wheel.

In testimony whereof I have signed my name to this specification, in the presence of two subscribing witnesses, at Los Angeles, California, this 4th day of January, 1901.

EPHRAIM W. FAIRBANKS.

Witnesses:
JAMES R. TOWNSEND,
JOHN A. MORRIS.